(12) United States Patent
Fujimoto et al.

(10) Patent No.: US 7,932,651 B2
(45) Date of Patent: Apr. 26, 2011

(54) MOTOR FOR CONTROLLER INTEGRATED ELECTRIC POWER STEERING APPARATUS AND ELECTRIC POWER STEERING APPARATUS

(75) Inventors: Kengo Fujimoto, Tokyo (JP); Yoshihito Asao, Tokyo (JP); Satoru Akutsu, Tokyo (JP); Isao Sonoda, Tokyo (JP); Kazuhisa Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 168 days.

(21) Appl. No.: 12/343,614

(22) Filed: Dec. 24, 2008

(65) Prior Publication Data

US 2009/0251030 A1    Oct. 8, 2009

(30) Foreign Application Priority Data

Apr. 7, 2008   (JP) ................................. 2008-099336

(51) Int. Cl.
*H02K 7/00* (2006.01)
(52) U.S. Cl. ........................................ 310/71; 310/68 B
(58) Field of Classification Search .................... 310/71, 310/68 B, 89
See application file for complete search history.

(56) References Cited

U.S. PATENT DOCUMENTS

| | | | |
|---|---|---|---|
| 6,297,572 B1 | 10/2001 | Sunaga et al. | |
| 6,577,030 B2 * | 6/2003 | Tominaga et al. | ........ 310/68 B |
| 6,707,185 B2 | 3/2004 | Akutsu et al. | |
| 7,021,418 B2 * | 4/2006 | Tominaga et al. | ............ 180/444 |

FOREIGN PATENT DOCUMENTS

| | | | |
|---|---|---|---|
| JP | 2001-136723 A | 5/2001 | |
| JP | 2002-120739 A | 4/2002 | |
| JP | 2004-157056 A | 6/2004 | |
| JP | 3593102 B2 | 9/2004 | |
| JP | 2006-261100 A | 9/2006 | |
| JP | 2007-028785 A | 2/2007 | |
| JP | 2007-209126 A | 8/2007 | |
| JP | 2007-288929 A | 11/2007 | |

OTHER PUBLICATIONS

Japanese Notification of Reason for Refusal dated Nov. 17, 2009 in corresponding Japanese Application No. 2008-099336.

* cited by examiner

*Primary Examiner* — Dang D Le
(74) *Attorney, Agent, or Firm* — Sughrue Mion, PLLC

(57) ABSTRACT

An apparatus is provided for obtaining a compact and inexpensive motor for controller integrated electric power steering apparatus capable of reducing a component for connection and the number of man-hours of assembly, and an electric power steering apparatus. A driving substrate having a power element is arranged in the side of a speed reduction mechanism of the inside of a case of a controller and a control substrate for controlling driving of the driving substrate is arranged in the side of a motor of the inside of the case and a resolver and a lead frame having connection wiring are arranged between a motor shaft direction of the control substrate and the driving substrate and an input-output terminal of the resolver is electrically connected to the control substrate. It is placed substantially coaxially in order of a motor, the controller and a speed reduction mechanism in the motor shaft direction.

11 Claims, 13 Drawing Sheets

MOTOR FOR CONTROLLER INTEGRATED ELECTRIC POWER STEERING APPARATUS AND ELECTRIC POWER STEERING APPARATUS

CROSS REFERENCE TO RELATED APPLICATION

The present application claims priority from Japanese Patent Application No. 2008-099336, which was filed on Apr. 7, 2008, the disclosure of which is herein incorporated by reference in its entirety.

TECHNICAL FIELD

This invention relates to a motor for electric power steering apparatus which is attached to a vehicle and assists steering force of a driver and an electric power steering apparatus, and particularly to a technique of connection between a controller for controlling driving of a motor and a resolver which is a rotational angle sensor.

BACKGROUND

In a conventional motor for controller integrated electric power steering apparatus, the motor comprises a permanent magnet synchronous motor for having a housing and a shaft disposed on an axis line of the housing and coupled to a steering mechanism of a vehicle and assisting steering force of a steering wheel through the shaft, and a controller for driving the motor inside a case, and an opening part through which a lead wire passes is formed in the housing, and an opening part through which the lead wire passes is also formed in the case, and the motor and the controller are integrated in correspondence with the housing opening part and the case opening part.

In the motor for electric power steering apparatus, a resolver which is a rotational angle sensor is fixed to the housing by screwing and input-output terminals of the resolver are fitted and fixed to a connector of one end of a lead wire for relay in a connector part formed integrally with the resolver and a connector of the other end of the lead wire is electrically connected by being fitted and fixed to a connector exposed from the case opening part.

[Patent Reference 1] Japanese Patent No. 3593102

SUMMARY

In the conventional motor for controller integrated electric power steering apparatus shown in Patent Reference described above, it is necessary to make electrical connection between a controller and an input-output signal of a resolver through a connector and a lead wire and there was a problem that a component for connection and the number of man-hours of assembly increase.

The invention solves the problem as described above, and an object of the invention is to obtain a compact and inexpensive motor for controller integrated electric power steering apparatus capable of reducing a component for connection and the number of man-hours of assembly, and an electric power steering apparatus.

A motor for controller integrated electric power steering apparatus according to the invention is a motor for controller integrated electric power steering apparatus constructed by integrally forming a motor for generating assist torque with respect to a steering wheel of a vehicle, a controller which drives and controls this motor and is accommodated in a case and a resolver which detects a rotational angle of a motor shaft of the motor and is accommodated in the case in a motor shaft direction, and this motor for controller integrated electric power steering apparatus is mounted in a speed reduction mechanism for reducing a speed of rotation of the motor and also is placed substantially coaxially in order of the motor, the controller and the speed reduction mechanism in the motor shaft direction and a driving substrate having a power element is arranged in the side of the speed reduction mechanism of the inside of the case and a control substrate for controlling driving of the driving substrate is arranged in the side of the motor of the inside of the case and the resolver and a lead frame comprising connection wiring are arranged between shaft directions of the control substrate and the driving substrate and an input-output terminal of the resolver is electrically connected to the control substrate.

An electric power steering apparatus according to the invention is constructed so that the motor for controller integrated electric power steering apparatus described above is mounted in a speed reduction mechanism for reducing a speed of rotation of this motor and also the motor is placed substantially coaxially with a shaft of the speed reduction mechanism.

According to the invention, it is constructed so that a driving substrate having a power element is arranged in the side of a speed reduction mechanism of the inside of a case of a controller and a control substrate for controlling driving of the driving substrate is arranged in the side of a motor of the inside of the case and a resolver and a lead frame comprising connection wiring are arranged between shaft directions of the control substrate and the driving substrate and an input-output terminal of the resolver is electrically connected to the control substrate, so that a distance between a shaft direction of the control substrate and the input-output terminal of the resolver is near and further it is placed substantially coaxially, so that connection can be made by a terminal without using a lead wire etc. and also the driving substrate, the lead frame and the control substrate are arranged near to the shaft direction substantially coaxially and connection can be made by a wiring terminal without using a lead wire etc., and a compact and inexpensive motor for controller integrated electric power steering apparatus capable of reducing a component for connection and the number of man-hours of assembly can be obtained.

Also, for example, each of the terminals can be connected in the same direction, and workability improves and the number of man-hours of assembly can be reduced.

According to an electric power steering apparatus according to the invention, it is constructed so that the motor for controller integrated electric power steering apparatus described above is mounted in a speed reduction mechanism for reducing a speed of rotation of the motor and also the motor is placed substantially coaxially with a shaft of the speed reduction mechanism, so that a compact and inexpensive electric power steering apparatus capable of reducing a component for connection and the number of man-hours of assembly can be obtained and the speed reduction mechanism side is near to a driving substrate and heat conduction from the driving substrate to the speed reduction mechanism side can improve and the whole apparatus can be constructed compactly at low cost.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

First Embodiment

Figure 1:
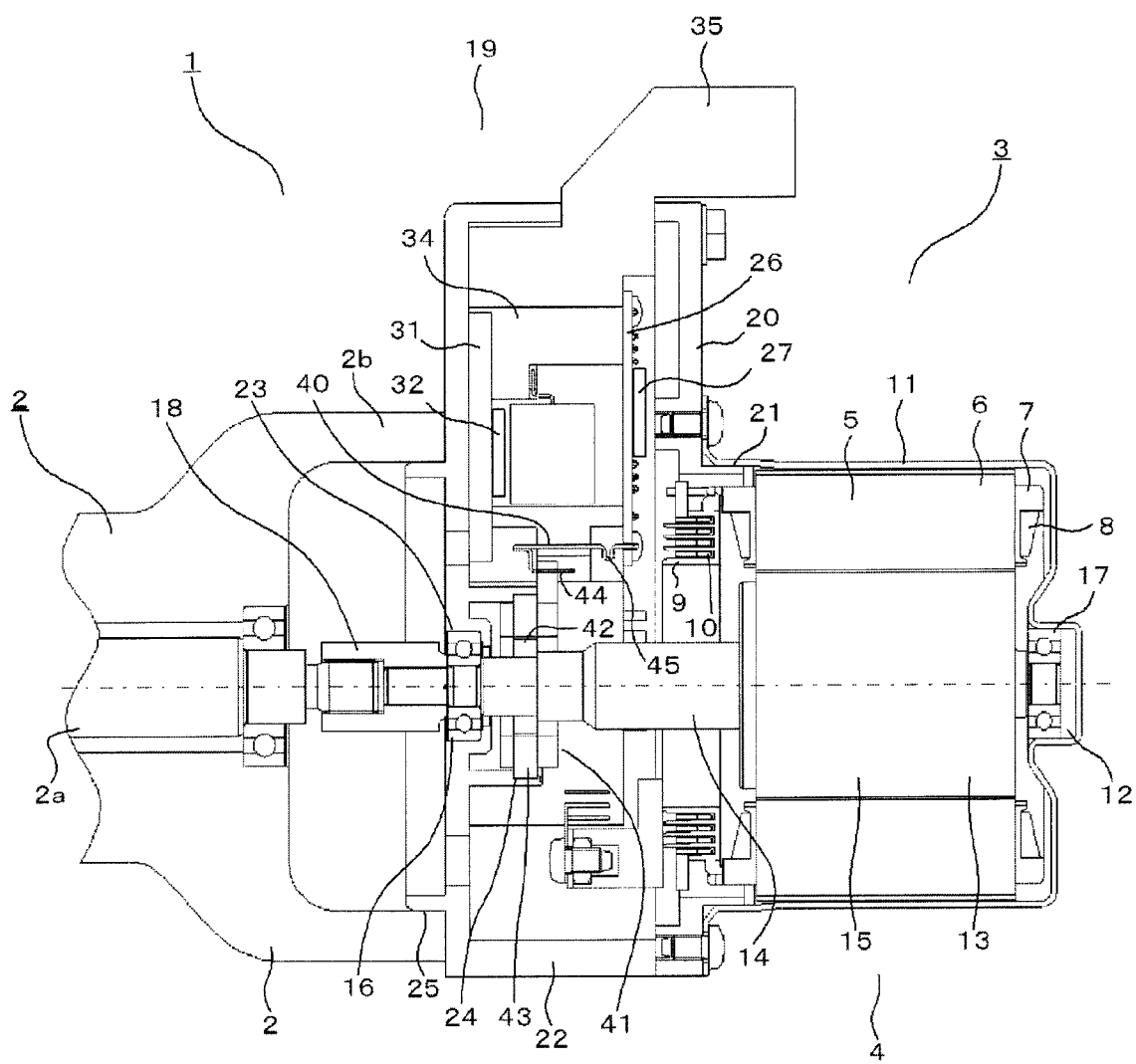
FIG. 1 is a sectional view showing a part of a speed reduction mechanism and a motor for controller integrated electric power steering apparatus of a first embodiment of the invention.
Figure 2:
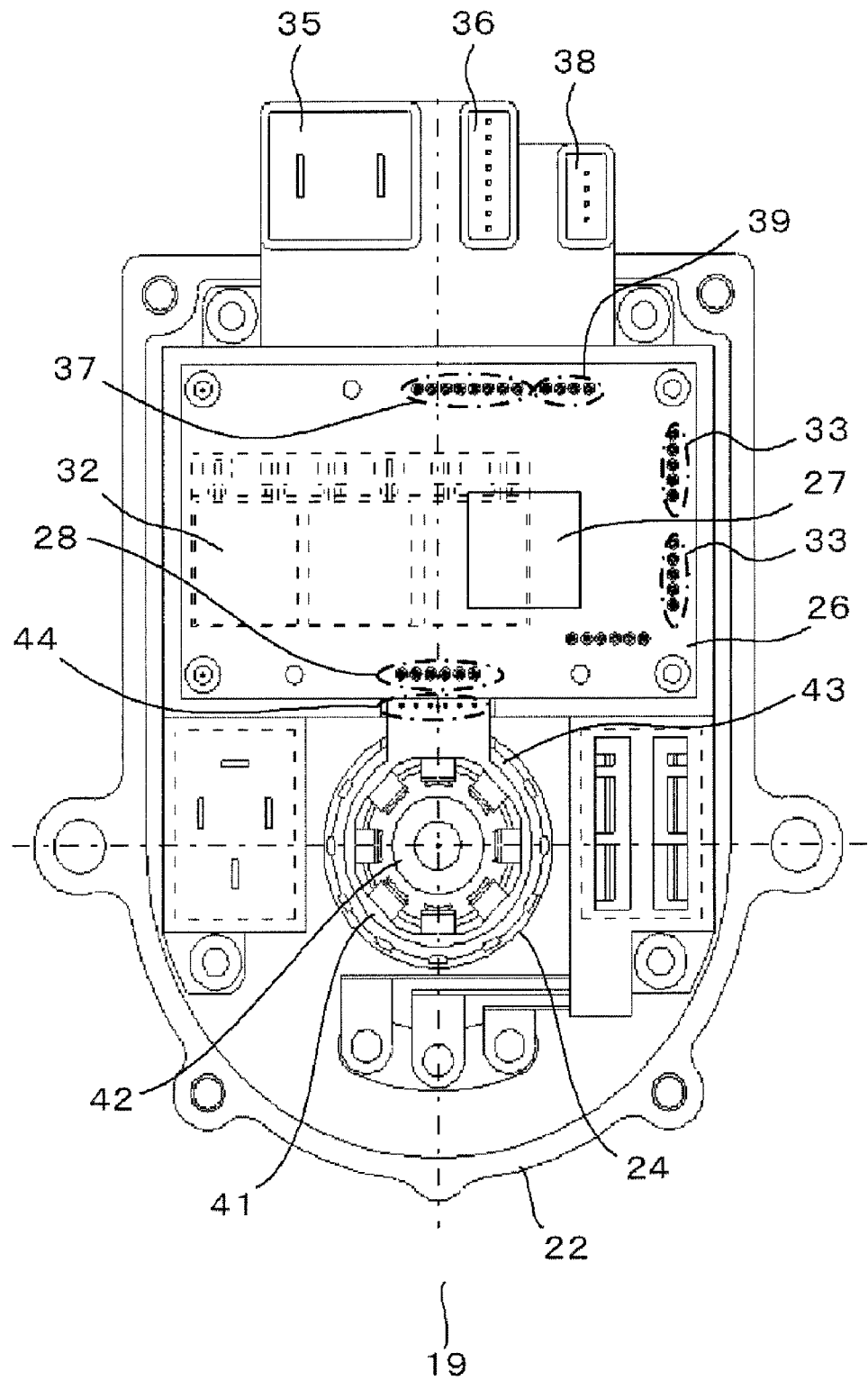
FIG. 2 is a front view in the case of viewing a controller of FIG. 1 from the side of a motor.
Figure 3:
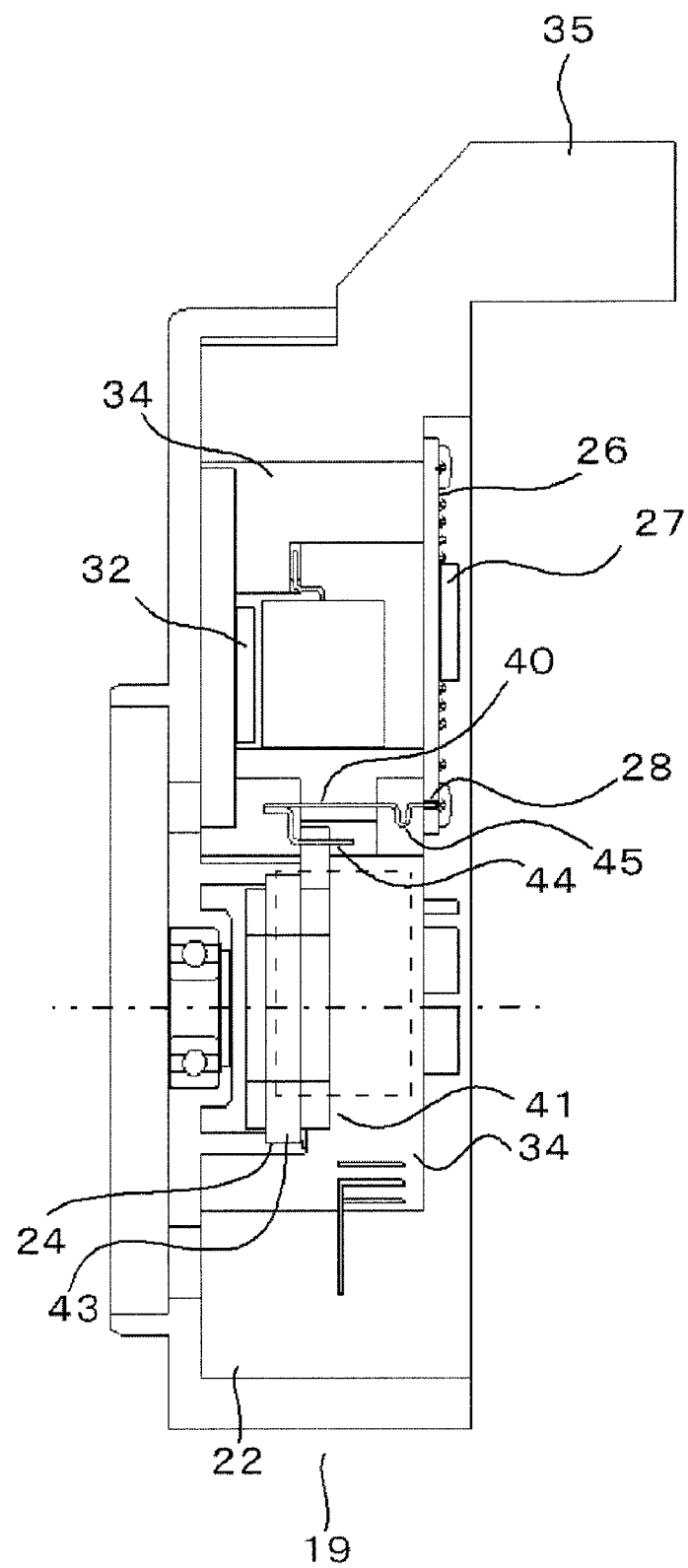
FIG. 3 is a sectional view of FIG. 2.

A first embodiment will be described based on FIGS. 1 to 3. FIG. 1 is a sectional view showing a part of a speed reduction mechanism and a motor for controller integrated electric power steering apparatus, and FIG. 2 is a front view in the case of viewing a controller of FIG. 1 from the side of a motor, and FIG. 3 is a sectional view of FIG. 2.

In addition, in each of the following drawings, description is made by assigning the same numerals to the same parts or corresponding parts.

A motor 4 is a permanent magnet synchronous motor, and a three-phase stator winding 8 is wound on a stator iron core 6 formed by laminating electromagnetic steel sheets through a resin-made insulator 7.

In a winding of each phase, Y or Δ (delta) connection is made by a winding terminal 10 received inside a resinous terminal holder 9.

The stator iron core 6 is pressed into an iron-made frame 11 and forms a stator 5 of the motor.

One end of the frame 11 has a bottom surface, and a bearing box part 12 for accommodating a rear bearing 17 for supporting one end of a rotor 13 is formed in the center of a bottom part.

A magnet 15 for generating magnetic force is attached to an outer circumferential part of a motor shaft 14 of the rotor 13.

The other end of the frame 11 is opened, and a spigot joint part 21 for fitting into an opening part of the frame 11 is formed in a motor side case 20 of a controller 19.

The motor side case 20 is formed by die cast molding of an aluminum alloy and is connected to a speed reducer side case 22 of a controller 19.

The speed reduction mechanism side case 22 is formed by die cast molding of an aluminum alloy and a bearing box part 23 for accommodating a front bearing 16 for supporting one end of the rotor 13 is formed in the case center.

A spigot joint part 25 is formed in the other end of the speed reduction mechanism side case 22 and is fitted into an attachment part 2b formed by die cast molding of an aluminum alloy of a speed reduction mechanism 2.

A case in which the controller 19 is accommodated is constructed of the speed reduction mechanism side case 22 and the motor side case 20.

The rear bearing 17 and the front bearing 16 are attached to both ends of the motor shaft 14 of the rotor 13 and are rotatably supported.

A boss 18 which is a coupling for being coupled to a shaft 2a of the speed reduction mechanism 2 is attached to the front side end of the motor shaft 14.

The controller 19 has a control substrate 26 in which a microcomputer 27 is installed and a driving substrate 31 in which a power element 32 such as a power MOSFET is installed, and is fixed in close contact with the inside of a surface opposed to the speed reduction mechanism 2 of the speed reduction mechanism side case 22.

The control substrate 26 is placed nearer to the motor side case 20 than the driving substrate 31, and a lead frame 34 which makes electrical connection between the control substrate 26 and the driving substrate 31 by wiring and is integrally formed by insert molding of a copper-made terminal by a resin material is disposed between the control substrate 26 and the driving substrate 31.

A power source connector 35, a connector 36 for torque sensor and a connector 38 for CAN communication are integrally formed in the lead frame 34 and are positioned and fixed inside the speed reduction mechanism side case 22.

A resolver rotor 42 of a resolver 41 for detecting a rotational angle of the motor shaft 14 is fixed to the motor shaft 14 and an outer circumferential surface of a resolver stator 43 is assembled into a fitting groove 24 with substantially a cylindrical shape having a rotational axis line of the motor shaft 14 in the center inside the speed reduction mechanism side case 22 and is positioned and fixed by caulking.

A terminal of a coil wound on the resolver stator 43 is wound on one end of an input-output terminal 44 of the resolver 41 and the other end extends in parallel with the rotational axis line of the motor shaft 14 and is electrically connected to one end of a lead terminal 40 for resolver connection protruding from the inside of the lead frame 34.

The other end of the lead terminal 40 for resolver connection protruding from the inside of the lead frame 34 extends toward the control substrate 26 in parallel with the rotational axis line of the motor shaft 14, and is directly electrically connected by soldering through a through hole 28 disposed in a wiring pattern of the control substrate 26.

In addition, a bend mechanism 45 is disposed in the lead terminal 40 for resolver connection.

In addition, the resolver stator 43 is fixed inside the speed reduction mechanism side case 22 by caulking, but a fixation method is not limited to this caulking and other fixation methods may be used as long as it has functionally necessary fixed force by being positioned by, for example, screwing or gluing.

As described above, a motor 3 for controller integrated electric power steering apparatus is constructed by integrally forming the motor 4, the controller 19 and the resolver 41 in a motor shaft direction and the motor 3 is mounted in the speed reduction mechanism 2 for reducing a speed of rotation of the motor 4 and also is placed substantially coaxially in order of the motor 4, the controller 19 and the speed reduction mechanism 2 in the motor shaft direction. The driving substrate 31 having the power element 32 is arranged in the side of the speed reduction mechanism 2 of the inside of the speed reduction mechanism side case 22 of the controller 19 and the control substrate 26 for controlling driving of the driving substrate 31 is arranged in the side of the motor 4 of the inside of the case 22.

The resolver 41 and the lead frame 34 are arranged between shaft directions of the control substrate 26 and the driving substrate 31 and the input-output terminal 44 of the resolver 41 is electrically connected to the control substrate 26 through the lead terminal 40 for resolver connection.

Also, the motor 3 for controller integrated electric power steering apparatus is mounted in the attachment part 2b of the speed reduction mechanism 2 for reducing a speed of rotation of the motor 3 and the motor 3 is placed substantially coaxially with the shaft 2a of the speed reduction mechanism 2 and an electric power steering apparatus 1 is constructed.

According to the motor 3 for controller integrated electric power steering apparatus of the configuration described above, the other end of the lead terminal 40 for resolver connection connected to the input-output terminal 44 of the resolver 41, one end of a lead terminal 37 for torque sensor, one end of a lead terminal 39 for CAN communication and one end of a lead terminal 33 for power element extend in the same direction from the inside of the lead frame 34, so that assembly and electrical connection can be made from the same direction in connection to the control substrate 26, so that working efficiency improves and the number of man-hours of assembly can be reduced and miniaturization and cost reduction can be achieved.

Also, the resolver stator 43 is directly assembled into the resolver stator fitting part 24 of the speed reduction mechanism side case 22, so that coaxiality with respect to a rotational axis line of the motor shaft 14 is good and a rotational angle of the motor shaft can be obtained with high accuracy.

In addition, the resolver stator 43 is tightly fixed to the resolver stator fitting part 24 by caulking, so that the resolver stator 43 has good vibration resistance.

Also, connection between the resolver 41 and the control substrate 26 of the controller 19 can be made without the intervention of an additional component such as a lead wire or a connector, so that by reducing the number of components, cost reduction can be achieved and connection quality of an electrical connection part improves.

Also, the bend mechanism 45 is had in the lead terminal 40 for resolver connection and flexibility is had so as to be able to move by a predetermined amount in a motor shaft line direction, so that even when a relative position of the control substrate 26 and the resolver stator 43 changes due to a change etc. in temperature, stress acting on a connection part can be eased and reliability of the apparatus can be improved.

Second Embodiment

Figure 4:
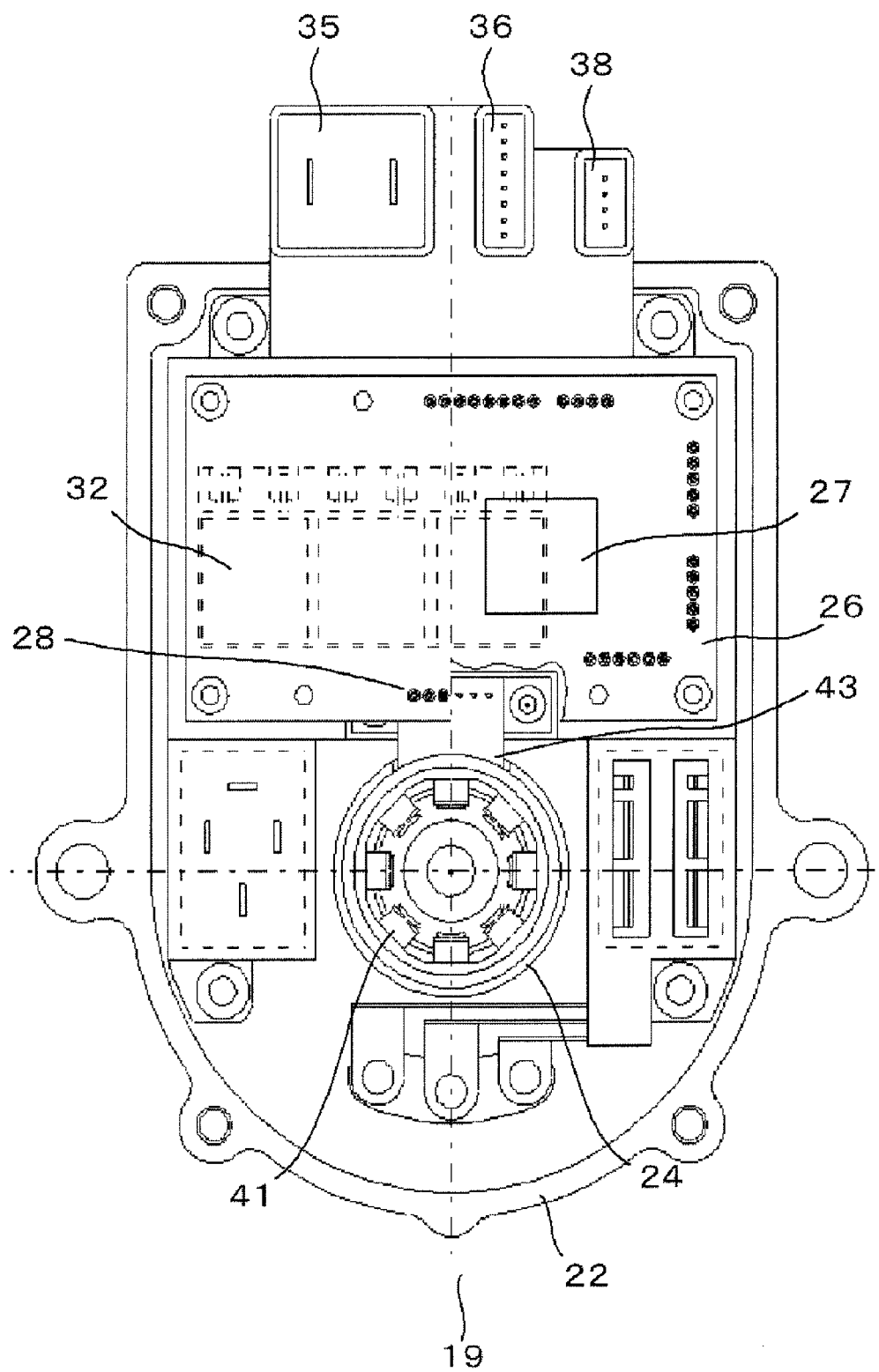
FIG. 4 is a front view in the case of viewing a controller of a second embodiment of the invention from the side of a motor.
Figure 5:
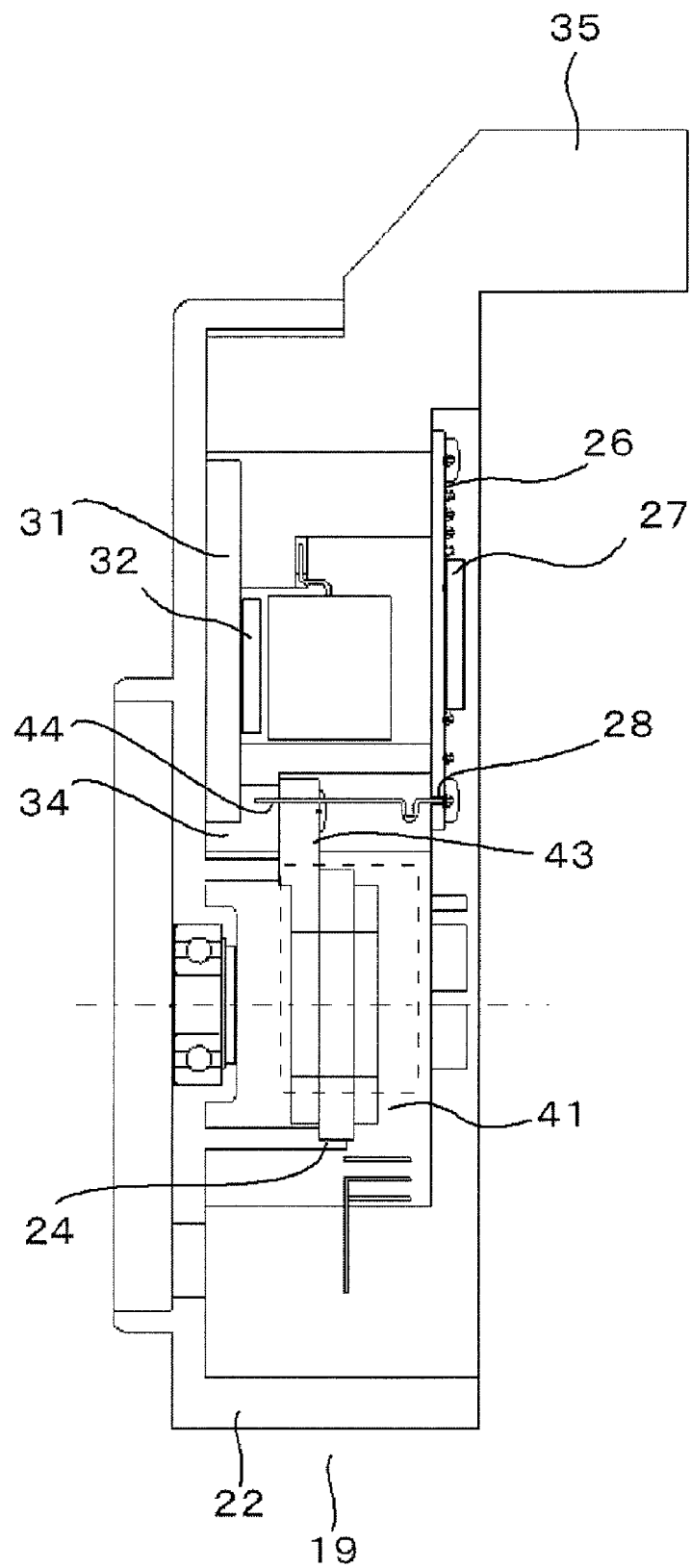
FIG. 5 is a sectional view of FIG. 4.

A second embodiment will be described based on FIGS. 4 and 5. FIG. 4 is a front view in the case of viewing a controller from the side of a motor, and FIG. 5 is a sectional view of FIG. 4.

A resolver stator 43 is positioned and fixed to a lead frame 34 by screwing and an outer circumferential surface of the resolver stator 43 is assembled into a fitting groove 24 with substantially a cylindrical shape having a rotational axis line of a motor shaft 14 disposed inside a speed reduction mechanism side case 22 in the center.

A terminal of a coil wound on the resolver stator 43 is wound on one end of an input-output terminal 44 of a resolver 41 and the other end is formed so as to extend toward a control substrate 26 in parallel with the shaft rotational axis line and the other end is directly electrically connected by soldering through a through hole 28 in which a wiring pattern of the control substrate 26 is disposed.

The other configuration is similar to that of the first embodiment.

In addition, in the second embodiment, the resolver stator 43 is fixed to the lead frame 34 by screwing, but a fixation method is not limited to this screwing and other fixation methods maybe used as long as it has functionally necessary fixed force by being positioned by, for example, gluing or thermal caulking.

According to the motor 3 for controller integrated electric power steering apparatus described above, the resolver stator 43 and the lead frame 34 can be handled in a set by previously fixing the resolver stator 43 to the lead frame 34, so that workability is good.

Also, after the control substrate 26 is mounted in the resolver stator 43 and the lead frame 34 in the set, work of assembly into the speed reduction mechanism side case 22 is facilitated and positioning of the lead frame 34 and the resolver stator 43 can be performed simultaneously and working efficiency improves and the number of man-hours of assembly can be reduced.

Also, the control substrate 26 is directly connected to the input-output terminal 44 of the resolver 41, so that with respect to the first embodiment, the number of components can be reduced further and cost reduction can be achieved and connection quality of an electrical connection part improves.

Also, the resolver stator 43 is not directly fixed inside the speed reduction mechanism side case 22, but is assembled into the fitting groove 24 with substantially the cylindrical shape having the rotational axis line of the disposed motor shaft 14 in the center, so that coaxiality with respect to the rotational axis line of the motor shaft 14 is good and a rotational angle of the motor shaft can be obtained with high accuracy.

The other effect is similar to that of the first embodiment.

Third Embodiment

Figure 6:
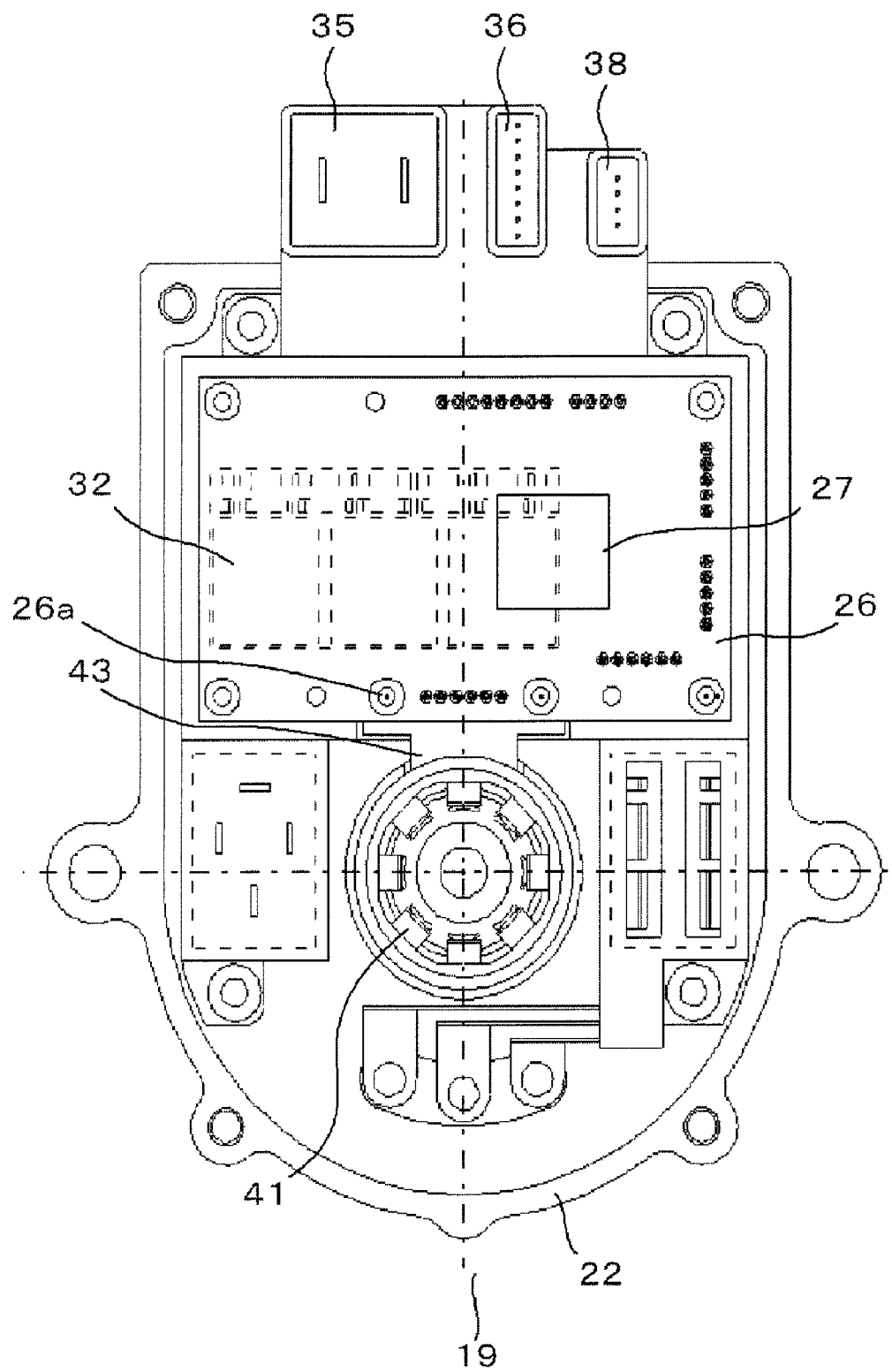
FIG. 6 is a front view in the case of viewing a controller of a third embodiment of the invention from the side of a motor.
Figure 7:
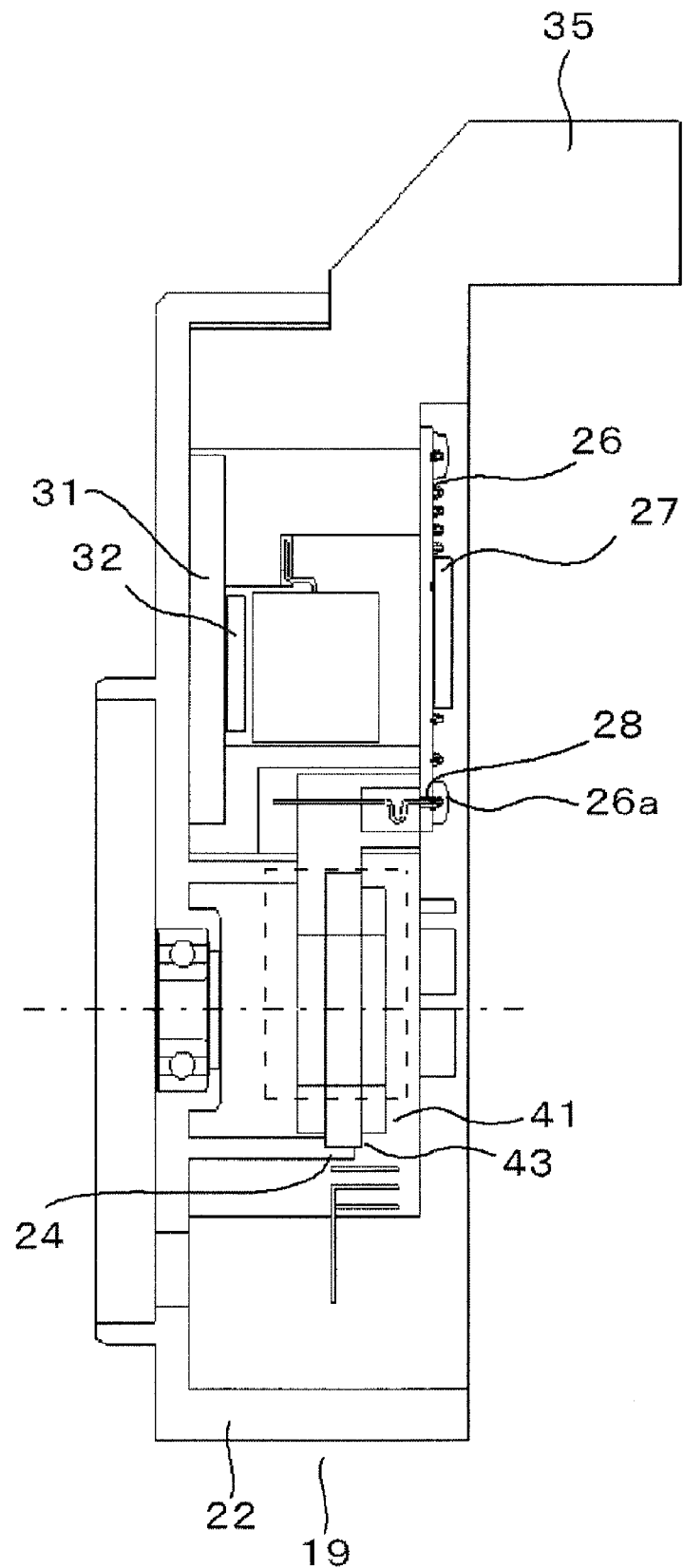
FIG. 7 is a sectional view of FIG. 6.

A third embodiment will be described based on FIGS. 6 and 7. FIG. 6 is a front view in the case of viewing a controller from the side of a motor, and FIG. 7 is a sectional view of FIG. 6.

A resolver stator 43 is positioned and fixed to a control substrate 26 by screwing using a screw 26a and an outer circumferential surface of a resolver 41 is assembled into a fitting groove 24 with substantially a cylindrical shape having a rotational axis line of a motor shaft 14 disposed inside a speed reduction mechanism side case 22 in the center.

The other configuration is similar to that of the second embodiment.

In addition, in the third embodiment, the resolver stator 43 is fixed to the control substrate 26 by screwing, but a fixation method is not limited to this screwing and other fixation methods may be used as long as it has functionally necessary fixed force by being positioned by, for example, gluing or thermal caulking.

According to the motor for controller integrated electric power steering apparatus described above, the resolver stator 43 and the control substrate 26 can be handled in a set by previously fixing the resolver stator 43 to the control substrate 26, so that workability is good.

Also, after the control substrate 26 and the resolver stator 43 in the set are mounted in a lead frame 34, work of assembly into the speed reduction mechanism side case 22 is facilitated and positioning of the lead frame 34 and the resolver stator 43 can be performed simultaneously and working efficiency improves and the number of man-hours of assembly can be reduced.

The other effect is similar to that of the second embodiment.

Fourth Embodiment

Figure 8:
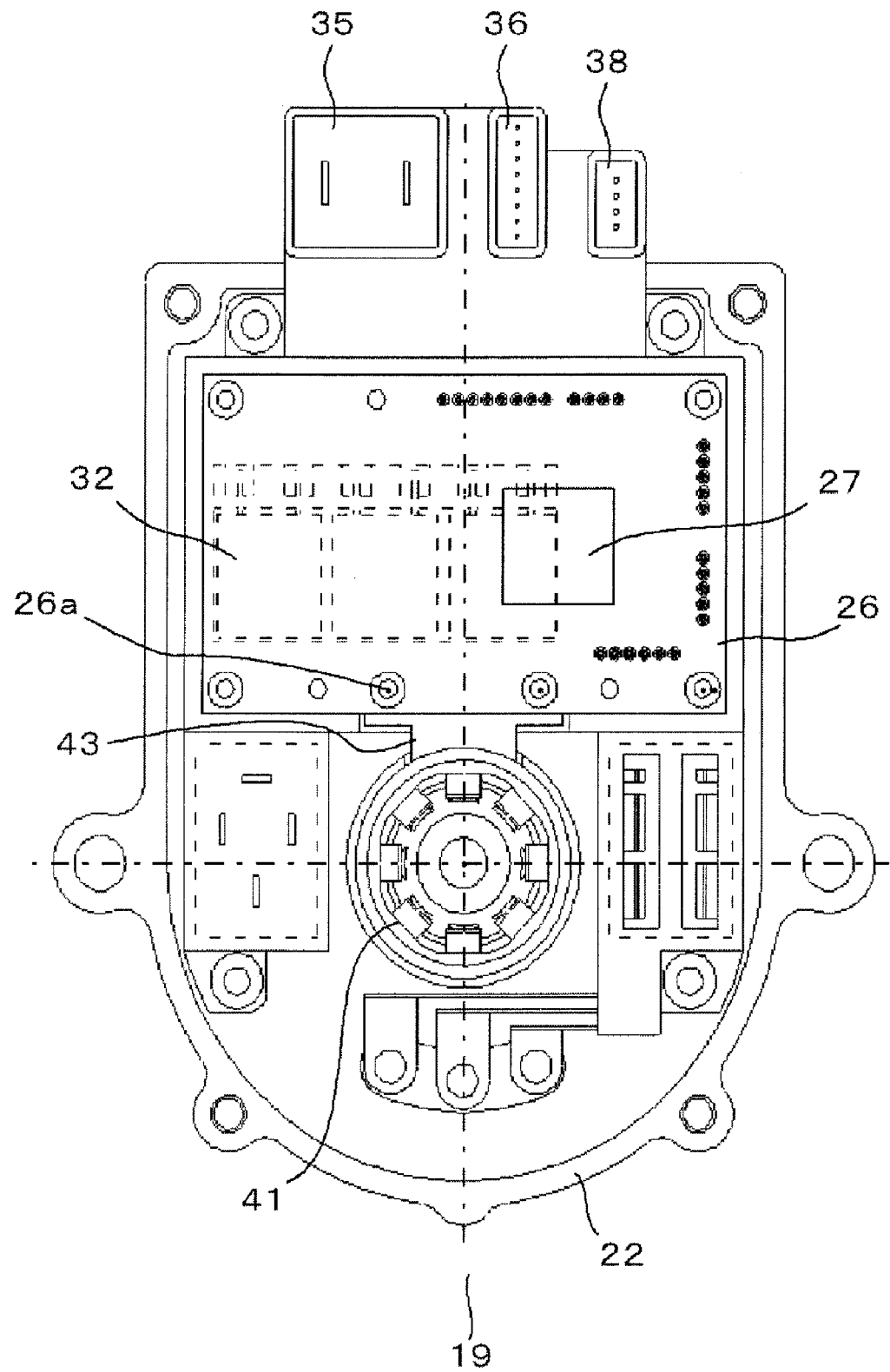
FIG. 8 is a front view in the case of viewing a controller of a fourth embodiment of the invention from the side of a motor.
Figure 9:
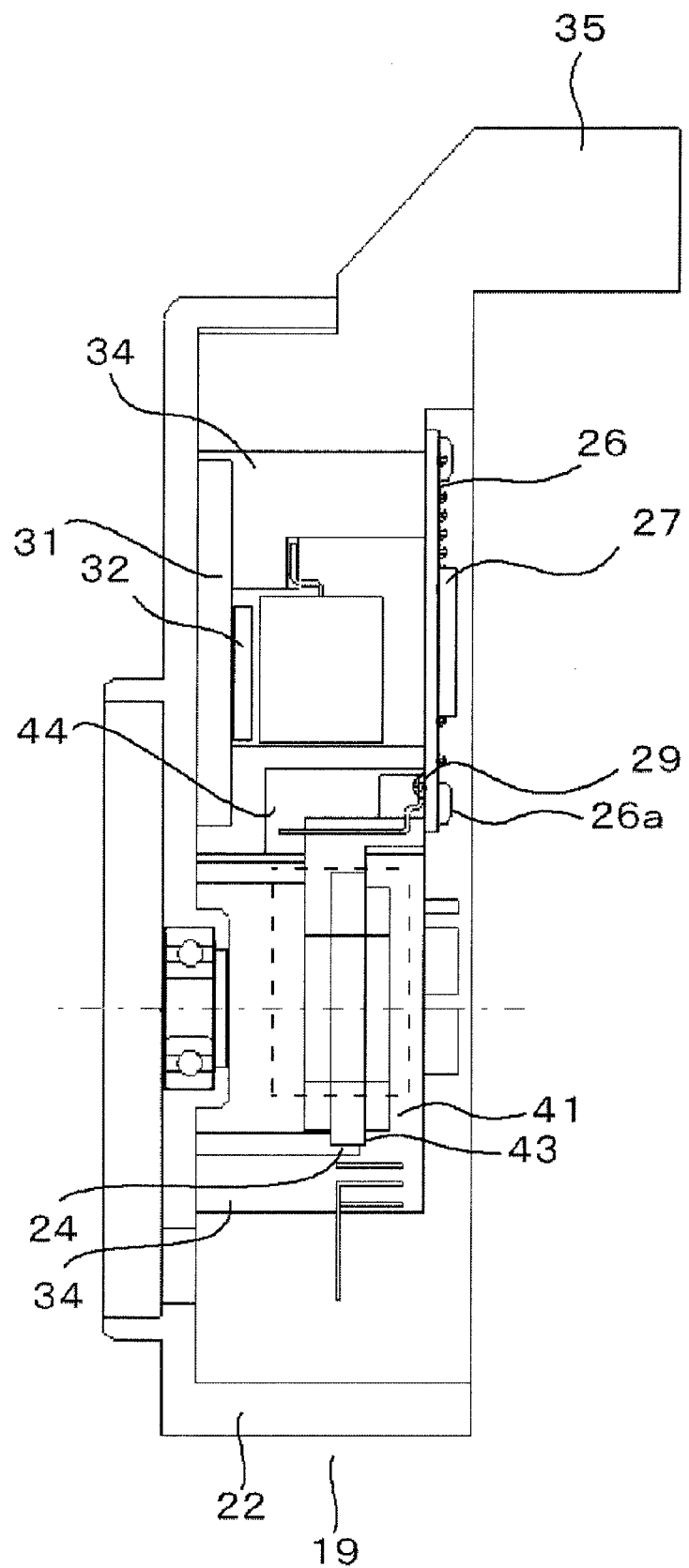
FIG. 9 is a sectional view of FIG. 8.

A fourth embodiment will be described based on FIGS. 8 and 9. FIG. 8 is a front view in the case of viewing a controller from the side of a motor, and FIG. 9 is a sectional view of FIG. 8.

A resolver stator 43 is positioned and fixed to a control substrate 26 by screwing using a screw 26a and an outer circumferential surface of the resolver stator 43 is assembled into a fitting groove 24 with substantially a cylindrical shape having a rotational axis line of a motor shaft 14 disposed inside a speed reduction mechanism side case 22 in the center.

Also, a terminal of a coil wound on the resolver stator 43 is wound on one end of an input-output terminal 44 and the other end is protruded in a direction vertical to the shaft rotational axis line and abuts on a land part 29 of a wiring pattern disposed in the control substrate 26 and is directly electrically connected by soldering.

The other end of the input-output terminal 44 is soldered to the control substrate 26 and is assembled into a controller 19.

The other configuration is similar to that of the third embodiment.

In addition, in the fourth embodiment, the resolver stator 43 is fixed to the control substrate 26 by screwing, but a fixation method is not limited to this screwing and other fixation methods may be used as long as it has functionally necessary fixed force by being positioned by, for example, gluing or thermal caulking.

According to the motor 3 for controller integrated electric power steering apparatus described above, the resolver stator 43 is not directly fixed inside the speed reduction mechanism side case 22, but is assembled into the fitting groove with substantially the cylindrical shape having the rotational axis line of the motor shaft 14 disposed in a manner similar to the third embodiment in the center, so that coaxiality with respect to the rotational axis line of the motor shaft 14 is good and a rotational angle of the motor shaft can be obtained with high accuracy.

Also, the resolver stator 43 and the control substrate 26 can be handled in a set by previously fixing the resolver stator 43 to the control substrate 26, so that workability is good.

Also, after the control substrate 26 and the resolver stator 43 in the set are mounted in a lead frame 34, work of assembly into the speed reduction mechanism side case 22 is facilitated and positioning of the lead frame 34 and the resolver stator 43 can be performed simultaneously and working efficiency improves and the number of man-hours of assembly can be reduced.

Also, the control substrate 26 is directly connected to the input-output terminal 44 of a resolver 41, so that the number of components can be reduced and cost reduction can be achieved and connection quality of an electrical connection part improves.

Fifth Embodiment

Figure 10:
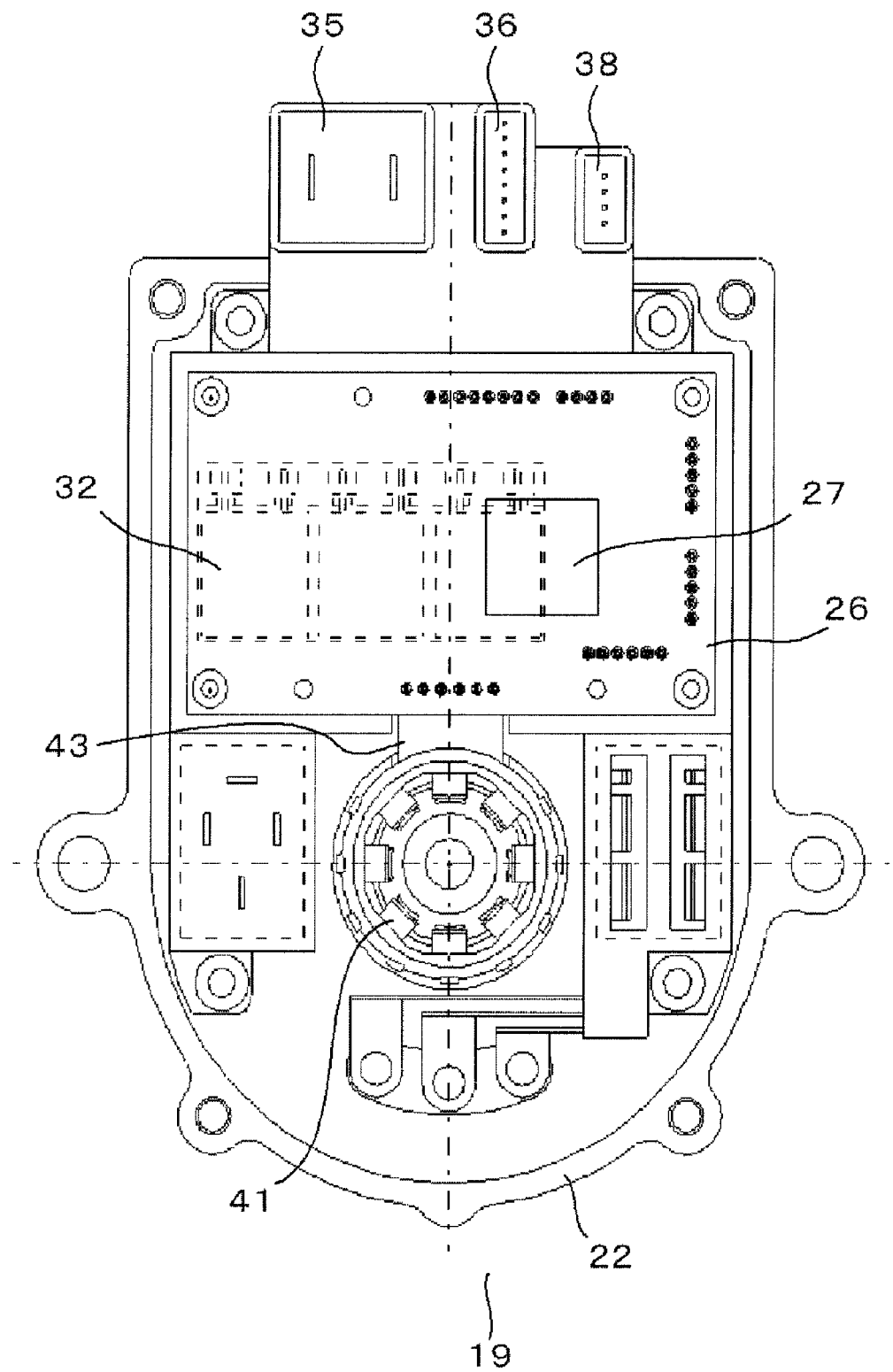
FIG. 10 is a front view in the case of viewing a controller of a fifth embodiment of the invention from the side of a motor.
Figure 11:
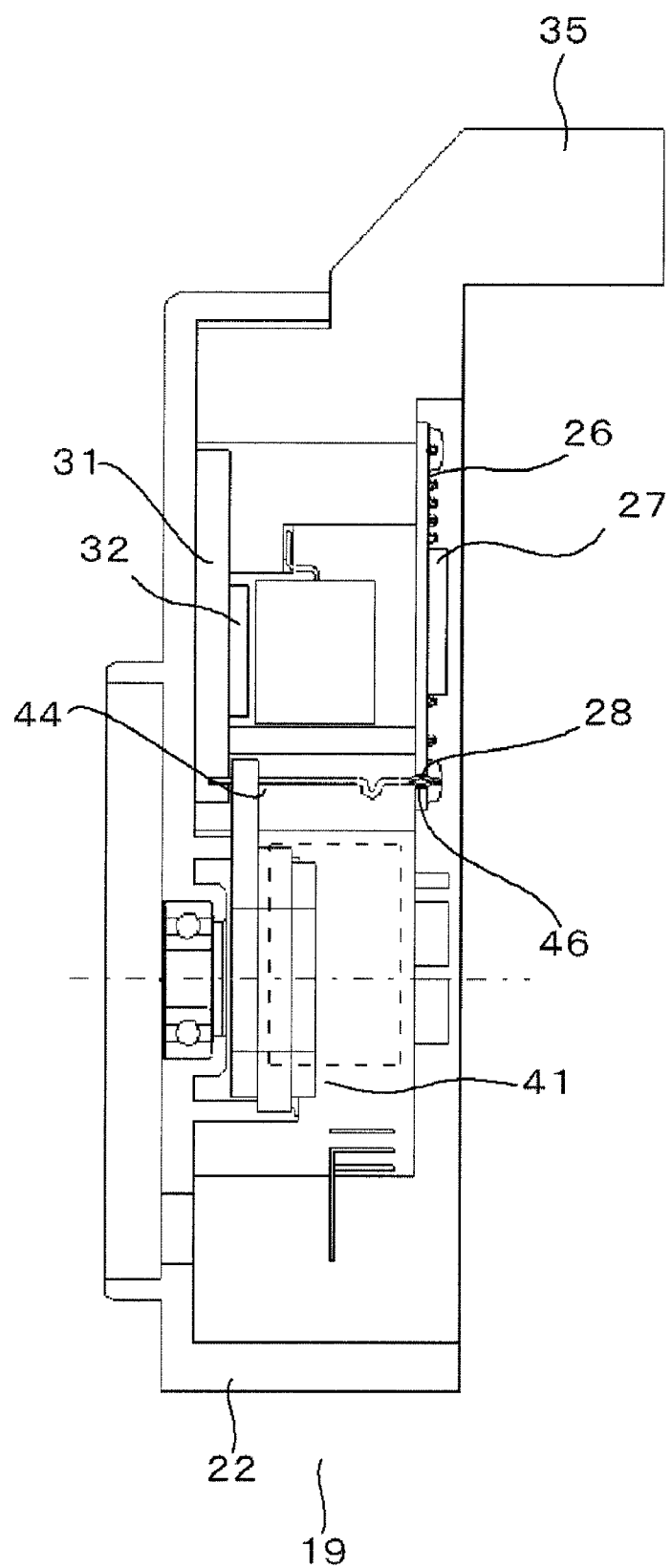
FIG. 11 is a sectional view of FIG. 10.

A fifth embodiment will be described based on FIGS. 10 and 11. FIG. 10 is a front view in the case of viewing a controller from the side of a motor, and FIG. 11 is a sectional view of FIG. 10.

A terminal of a coil wound on a resolver stator 43 is wound on one end of an input-output terminal 44 of a resolver 41 and the other end is formed so as to extend toward a control substrate 26 in parallel with a rotational axis line of a shaft 14 and its top part is formed in a press fit shape 46 and is directly electrically connected by being pressed and fitted in a through hole 28 in which a wiring pattern of the control substrate 26 is disposed.

The other configuration is similar to that of the first embodiment and the effect is similar to that of the first embodiment.

Sixth Embodiment

Figure 12:
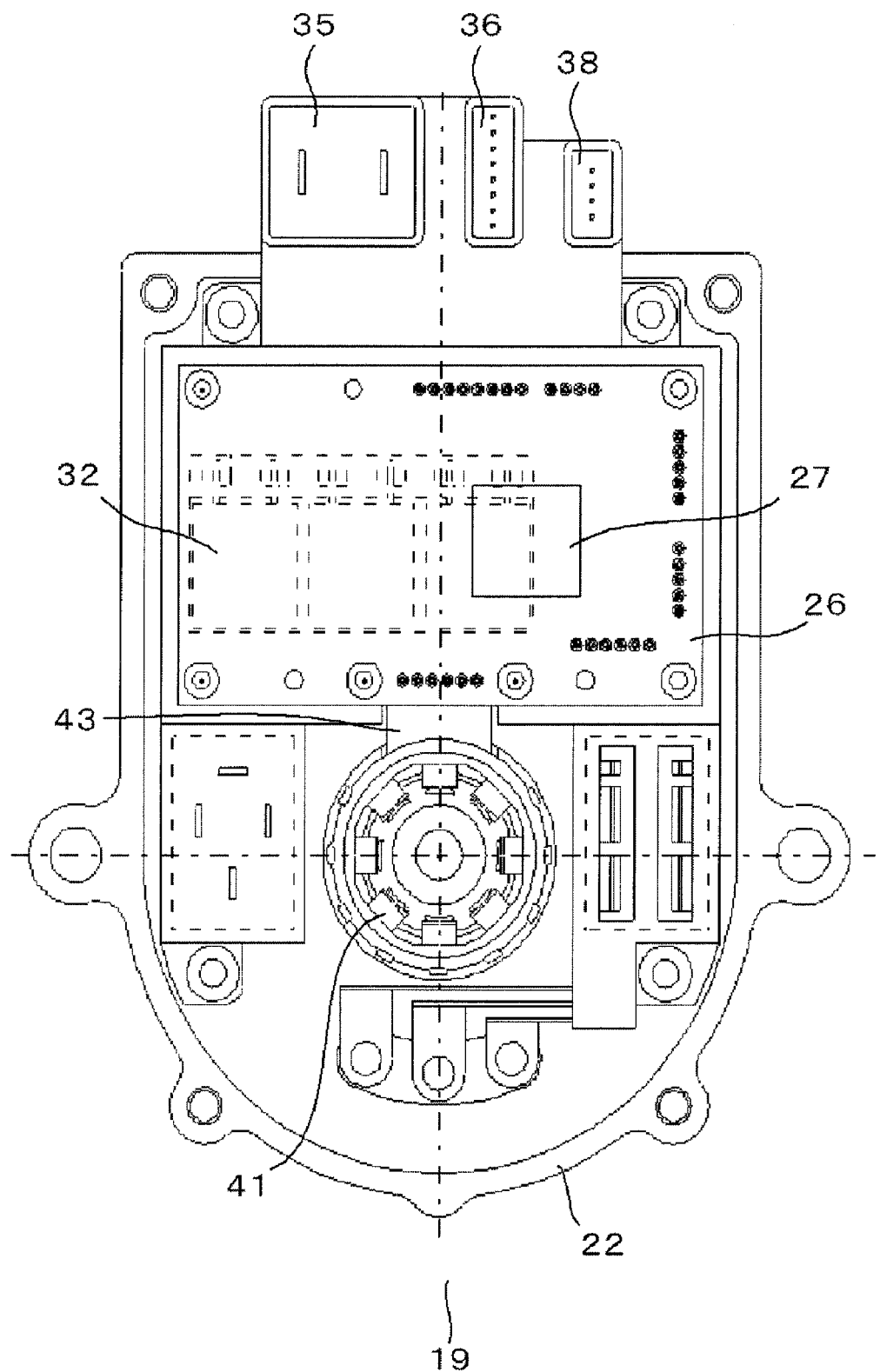
FIG. 12 is a front view in the case of viewing a controller of a sixth embodiment of the invention from the side of a motor.
Figure 13:
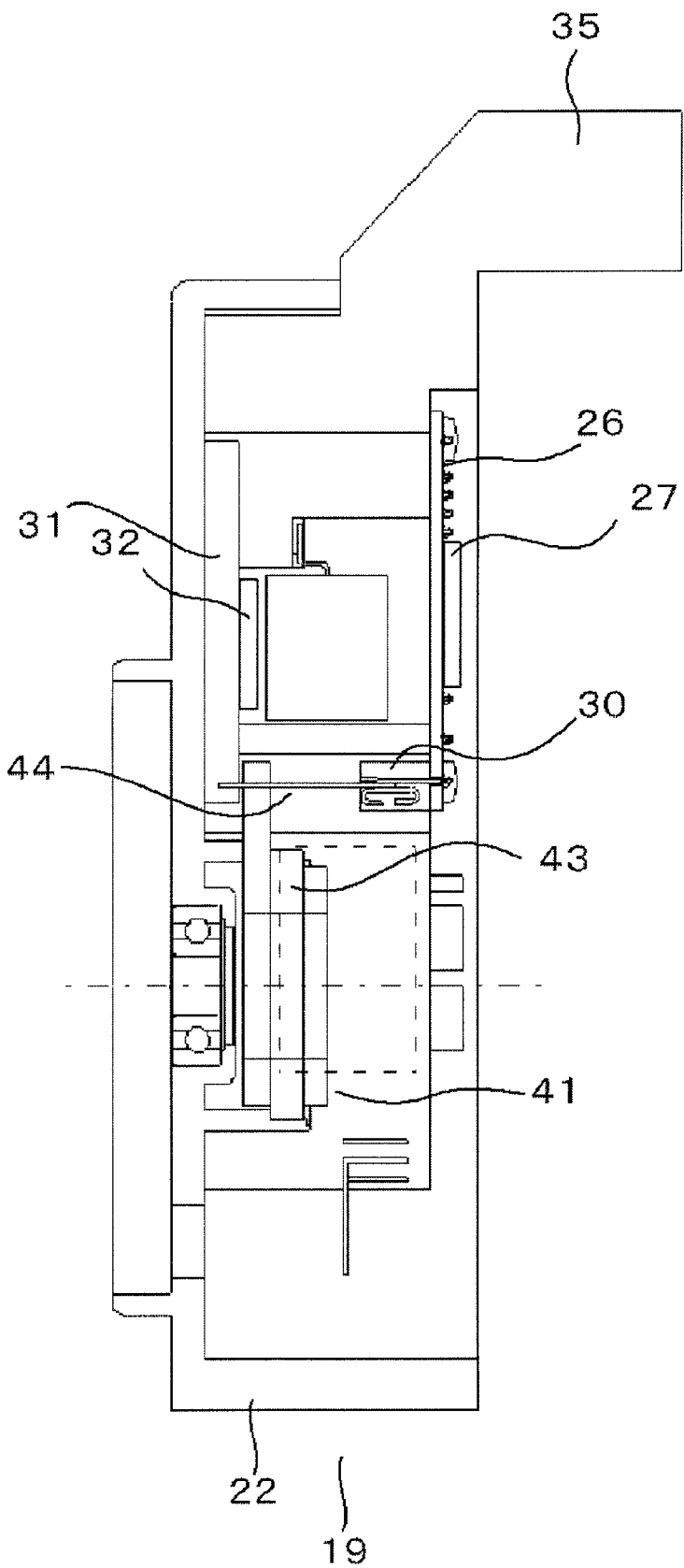
FIG. 13 is a sectional view of FIG. 12.

A sixth embodiment will be described based on FIGS. 12 and 13. FIG. 12 is a front view in the case of viewing a controller from the side of a motor, and FIG. 13 is a sectional view of FIG. 12.

A resolver stator 43 is fixed to a speed reduction mechanism side case 22.

A terminal of a coil wound on the resolver stator 43 is wound on one end of an input-output terminal 44 of a resolver 41 and the other end of the input-output terminal 44 is formed so as to extend toward a control substrate 26 in parallel with a rotational axis line of a motor shaft.

On the other hand, a connector 30 for resolver connection is fixed on the control substrate 26 opposed to the other end of the input-output terminal 44 of the resolver 41 and is directly electrically connected by inserting the input-output terminal 44 of the resolver 41.

The other configuration is similar to that of the fifth embodiment.

According to the motor 3 for controller integrated electric power steering apparatus described above, flexibility is had so that a relative position of the control substrate 26 and the resolver stator 43 can move by a predetermined amount in a shaft line direction of a motor shaft 14, so that even when a relative position of the shaft line direction of the shaft 14 of the control substrate 26 and the resolver stator 43 changes due to a change etc. in temperature, stress acting on a connection part between the resolver stator 43 and the connector 30 for resolver connection fixed to the control substrate 26 can be eased, so that reliability of the apparatus can be improved.

The other effect is similar to that of the first embodiment.

In addition, in the sixth embodiment, the input-output terminal 44 of the resolver 41 is directly inserted into the connector 30 for resolver connection fixed to the control substrate 26, but electrical connection may be made by also disposing a connector formed integrally with an insulator in the side of the resolver stator and fitting into the connector 30 for resolver connection fixed to the control substrate 26.

In addition, in each of the embodiments described above, the speed reduction mechanism side case 22 and the attachment part 2b of the speed reduction mechanism 2 have been formed as different bodies, but these maybe integrated. By adopting this configuration, the speed reduction mechanism side case 22 can be eliminated, so that the number of components and the number of man-hours of assembly can be reduced and the more compact and inexpensive motor 3 for controller integrated electric power steering apparatus and the electric power steering apparatus 1 can be obtained.

By adopting the integral configuration, heat conductivity between the driving substrate 31 and the speed reduction mechanism 2 improves further and the more compact and inexpensive apparatus can be obtained and the apparatus capable of improving heat dissipation properties in addition to the effect of each of the embodiments described above can be obtained.

Since the resolver 41 and the lead frame 34 are arranged between shaft directions of the control substrate 26 and the driving substrate 31, the control substrate 26 is not directly near to the driving substrate 31 and heat resistance can be improved.

Since the apparatus is arranged substantially coaxially, for example, an area of contact between each of the members related to heat conduction can efficiently be ensured, and the heat conduction is enabled compactly and efficiently.

In addition, in the embodiments described above, the form of the motor 4 has been described by the permanent magnet synchronous motor, but is not limited to this and needless to say, for example, an induction motor may be used.

Also, the frame 11 has been described by the iron-made frame, but an aluminum material may be used and in this case, heat conductivity can be improved further.

What is claimed is:

1. A motor for controller integrated electric power steering apparatus comprising:
    a motor for generating assist torque with respect to a steering wheel of a vehicle;
    a controller which drives and controls this motor and is accommodated in a case; and
    a resolver which detects a rotational angle of a motor shaft of the motor and is accommodated in the case,
    wherein the motor, the controller and the resolver are formed integrally in a motor shaft direction, and
    the motor for controller integrated electric power steering apparatus is mounted in a speed reduction mechanism for reducing a speed of rotation of the motor and also is placed substantially coaxially in order of the motor, the controller and the speed reduction mechanism in the motor shaft direction,
    the motor for controller integrated electric power steering apparatus, further comprising:
    a driving substrate having a power element is arranged in the side of the speed reduction mechanism of the inside of the case; and
    a control substrate for controlling driving of the driving substrate is arranged in the side of the motor of the inside of the case,
    wherein the resolver and a lead frame comprising connection wiring are arranged between the control substrate and the driving substrate in the motor shaft direction, and
    an input-output terminal of the resolver is electrically connected to the control substrate.

2. The motor for controller integrated electric power steering apparatus according to claim 1,
    wherein a resolver stator is fixed inside a speed reduction mechanism side case of the controller in a state in which the input-output terminal of the resolver is opposed to the control substrate.

3. The motor for controller integrated electric power steering apparatus according to claim 1,
    wherein a resolver stator is fixed to the lead frame of the controller in a state in which the input-output terminal of the resolver is opposed to the control substrate.

4. The motor for controller integrated electric power steering apparatus according to claim 1,
    wherein a resolver stator is attached to the control substrate in a state in which the input-output terminal of the resolver is opposed to the control substrate.

5. The motor for controller integrated electric power steering apparatus according to claim 4,
    wherein the other end of the input-output terminal in which a winding of the resolver is connected to one end is electrically connected to a wiring pattern land part of the control substrate by abutting on the wiring pattern land part in the motor shaft direction and soldering the other end.

6. The motor for controller integrated electric power steering apparatus according to claim 1,
    wherein the input-output terminal of the resolver is directly electrically connected to the control substrate.

7. The motor for controller integrated electric power steering apparatus according to claim 1,
    wherein the other end of the input-output terminal in which a winding of the resolver is connected to one end is electrically connected to a through hole disposed in a wiring pattern of the control substrate by passing through the through hole in the motor shaft direction and soldering the other end.

8. The motor for controller integrated electric power steering apparatus according to claim 1,
    wherein the other end of the input-output terminal in which a winding of the resolver is connected to one end is electrically connected to a through hole disposed in a wiring pattern of the control substrate by passing through the through hole in the motor shaft direction and making a press fit.

9. The motor for controller integrated electric power steering apparatus according to claim 1,
    wherein the other end of the input-output terminal in which a winding of the resolver is connected to one end is electrically connected to a terminal of the connector attached to the control substrate by inserting the other end in the motor shaft direction.

10. The motor for controller integrated electric power steering apparatus according to claim 1,
    wherein a terminal of connection between the control substrate and the input-output terminal to which a winding of the resolver is connected is formed and constructed so that a relative position of the control substrate and the resolver can move.

11. An electric power steering apparatus comprising the motor for controller integrated electric power steering apparatus according to claim 1,
    wherein the motor is mounted in a speed reduction mechanism for reducing a speed of rotation of the motor, and the motor is placed substantially coaxially with a shaft of the speed reduction mechanism.

* * * * *